April 9, 1929.  C. HARTMAN  1,708,881
CABLE ENGAGING DEVICE FOR REPLACING BULL HOOKS
Filed April 19, 1928
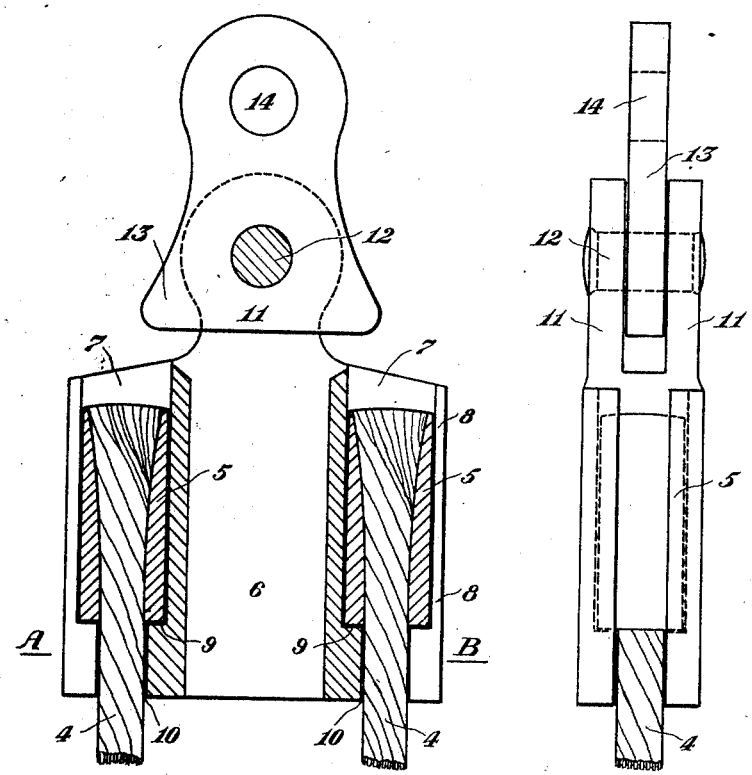
Fig. 1.  Fig. 2.
Fig. 3.
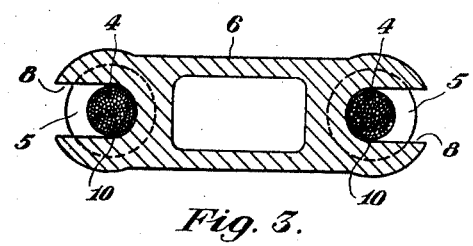
Charles Hartman
Inventor
Attorney Patented Apr. 9, 1929.

1,708,881

UNITED STATES PATENT OFFICE.

CHARLS HARTMAN, OF KNOX BAY, BRITISH COLUMBIA, CANADA.

CABLE-ENGAGING DEVICE FOR REPLACING BULL HOOKS.

Application filed April 19, 1928, Serial No. 271,368, and in Canada May 3, 1927.

This invention relates to a cable engaging device functioning in the same way as a bull hook in connection with logging operations. The object of the invention is to provide such a device which will be much cheaper to construct than the usual bull hook and can also be more quickly operated and locked.

Bull hooks as usually employed in connection with logging work have been hitherto costly in form involving difficult smithing work and frequently also costly machine work in connection with screw threads, springs and other more or less complicated mechanisms, and as these devices owing to the arduous nature of the work are continually failing through one cause or another the question of replacing them forms a considerable item of expense which it is the intention of this device to largely avoid.

My invention is intended for use with two cables but may be readily adapted for a single cable to take a central pull without difficulty. It consists essentially of two ferrules or receptacles spaced apart in parallel alignment and formed into a nearly flat body-member.

Each ferrule is longitudinally slotted through on the outside wall sufficiently large to admit the cable only, the interior of the ferrule itself being large enough to readily admit a thimble secured to and babbitted upon the extremity of the cable, the arrangement being such that the cable may readily be inserted in the ferrule lengthwise through the slot but the thimble may be only inserted from the outer end of the ferrule and when so inserted rests upon the bottom of the ferrule as an abutment, the cable passing through a hole in the bottom of the ferrule coincident with the slot.

To release the cable from the ferrule the thimble is slidden beyond the outer extremity, the cable easily passing through the slot lengthwise.

The locking device consists of a simple flat keeper pivotable in two ears which extend beyond the outer end of the body of the device and so shaped that when the device is under strain both the thimbles are held in their ferrules, but immediately the strain is released the keeper may be knocked over at right angles first to one side and then to the other allowing the cables to be easily and instantly withdrawn.

The keeper is extended outwardly to form an eyebolt for a shackle pin or the like.

The invention is clearly shown by the drawings herewith forming part of this application, in which:

Fig. 1 is a front sectional view of the device.

Fig. 2, a side view, and

Fig. 3, a cross section on line A—B.

The drawings show two cables 4 secured in connection by the aid of parallel thimbles 5 which are secured in the usual way by Babbit metal. A body-member 6 is formed with two parallel cylindrical receptacles or ferrules 7 spaced apart as shown and each having a longitudinal slot 8 through its outer wall. This slot extends throughout the entire length of the receptacle and allows the cable to easily pass through it.

The interior of the receptacle is enlarged in its diameter at the outer end sufficiently to receive the thimble 5 which abuts against the bottom 9, the latter being pierced by the hole 10 large enough only to admit the cable 4 and coincident with the longitudinal slot 8.

The body is extended on each side at 11 to form ears for the reception of the pin 12 which forms the pivot for the keeper 13.

This latter is extended so as to form the eyebolt 14 for carrying the shackle pin. When the device is under strain the keeper 13 partially closes the tops of both receptacles 7 and thus locks the thimbles 5 therein. These latter can only be released by taking the strain off the cables, thus ensuring absolute safety during working operations.

Having now particularly described my invention, what I claim and desire to be protected in by Letters Patent, is:

A cable engaging device functioning as a bull hook comprising, a body member in which are formed two cylindrical receptacles in parallel alignment and spaced apart, the wall of each said receptacle being slotted through over its entire length in a direction parallel to its axis and on its outer side, said receptacles each having a portion of enlarged diameter open at one end and a portion of reduced diameter open at the opposite end, parallel thimbles babbitted to the extremity of each said cable, said enlarged portions being adapted to receive the said thimbles, said reduced portions being adapted to only receive said cables, an ear projecting beyond and from each side of said body-member, a pin passing through said ears, a flat keeper pivotal on each pin between said ears and extended to carry a shackle pin, said keeper being adapted when under working strain to obstruct the outer orifices of said cylindrical receptacles and thus hold said thimbles in place in said receptacles, said keeper when turned right-angularly to the axes of said cylindrical receptacles to uncover one or other of the outer orifices of said receptacles and so permitting the said thimble to be withdrawn and inserted.

In testimony whereof I affix my signature.

CHARLS HARTMAN.